United States Patent
Rega et al.

[19]

[11] Patent Number: 6,054,208
[45] Date of Patent: Apr. 25, 2000

[54] FILM FORMING MIXTURES, IMAGE BEARING FILMS AND IMAGE BEARING RETROREFLECTIVE SHEETING

[75] Inventors: Robert K. Rega, Mentor; George H. Wise, Fairport, both of Ohio

[73] Assignee: Avery Dennison Corporation, Pasadena, Calif.

[21] Appl. No.: 09/008,004

[22] Filed: Jan. 16, 1998

[51] Int. Cl.$^7$ .................................................. B32B 5/16
[52] U.S. Cl. ........................... 428/323; 359/536; 359/538; 359/541; 428/325; 428/327; 428/425.8; 428/425.9
[58] Field of Search .................................... 428/323, 325, 428/327, 402, 425.8, 425.9; 359/536, 538, 541

[56] References Cited

U.S. PATENT DOCUMENTS

| | | | |
|---|---|---|---|
| 3,914,189 | 10/1975 | Rudner et al. | 260/2.5 AC |
| 4,192,925 | 3/1980 | Schafer et al. | 521/163 |
| 4,292,214 | 9/1981 | Blount | 260/9 |
| 4,305,991 | 12/1981 | Meyborg et al. | 428/318.8 |
| 4,368,278 | 1/1983 | Rasshofer et al. | 521/115 |
| 4,451,597 | 5/1984 | Victorius | 524/39 |
| 4,505,967 | 3/1985 | Bailey | 428/164 |
| 4,648,932 | 3/1987 | Bailey | 156/276 |
| 4,664,966 | 5/1987 | Bailey et al. | 428/203 |
| 4,725,494 | 2/1988 | Belisle et al. | 428/325 |
| 4,725,495 | 2/1988 | Garbe et al. | 428/335 |
| 4,743,672 | 5/1988 | Goel | 528/44 |

(List continued on next page.)

FOREIGN PATENT DOCUMENTS 223564   5/1987   European Pat. Off. .

*Primary Examiner*—Hoa T. Le
*Attorney, Agent, or Firm*—Renner, Otto, Boisselle & Sklar

[57] ABSTRACT

Aliphatic polyurethane film forming mixtures, image bearing aliphatic polyurethane films, and image bearing retroreflective sheeting having such image bearing films are described. The image-bearing aliphatic polyurethane films of the invention comprise an aliphatic polyurethane film derived from a film-forming mixture comprising (A) an aliphatic polyurethane, and (B) at least one hydroxy-containing imidazoline surfactant represented by the formula

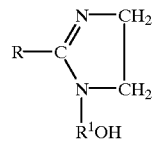

wherein R is an aliphatic group containing from about 10 to about 22 carbon atoms and $R^1$ is an alkylene group containing from 1 to about 3 carbon atoms, said film having printed thereon either a monocolor image and a clear overcoat or a multicolor image with or without a clear overcoat wherein the monocolor image is derived from at least one UV radiation curable ink which is cured prior to application of the clear overcoat, and the multicolor image is derived from at least two UV radiation curable inks applied sequentially with curing after each ink application and before application of any clear overcoat. The retroreflective sheetings described herein and having the image bearing aliphatic urethane cover sheets or films may be enclosed lens or encapsulated lens retroreflective sheetings. The images may be single color images or multicolor images derived from UV radiation curable inks and, the images optionally coated with a UV cured clear overcoat.

63 Claims, 1 Drawing Sheet

U.S. PATENT DOCUMENTS

| | | | |
|---|---|---|---|
| 4,755,425 | 7/1988 | Huang | 428/331 |
| 4,767,659 | 8/1988 | Bailey et al. | 428/203 |
| 4,808,471 | 2/1989 | Grunzinger | 428/325 |
| 4,844,976 | 7/1989 | Huang | 428/323 |
| 4,950,525 | 8/1990 | Bailey | 428/164 |
| 5,008,142 | 4/1991 | Wilson et al. | 428/203 |
| 5,055,347 | 10/1991 | Bacon, Jr. | 428/250 |
| 5,073,404 | 12/1991 | Huang | 427/39 |
| 5,085,918 | 2/1992 | Rajan et al. | 428/195 |
| 5,117,304 | 5/1992 | Huang et al. | 359/529 |
| 5,336,702 | 8/1994 | Kamikado | 523/417 |
| 5,378,520 | 1/1995 | Nagaoka et al. | 428/72 |
| 5,514,441 | 5/1996 | Pohto et al. | 428/72 |
| 5,541,338 | 7/1996 | Dewhurst et al. | 548/313.7 |
| 5,567,761 | 10/1996 | Song | 524/523 |
| 5,621,016 | 4/1997 | Murty et al. | 521/159 |
| 5,739,185 | 4/1998 | Haneishi et al. | 523/415 |

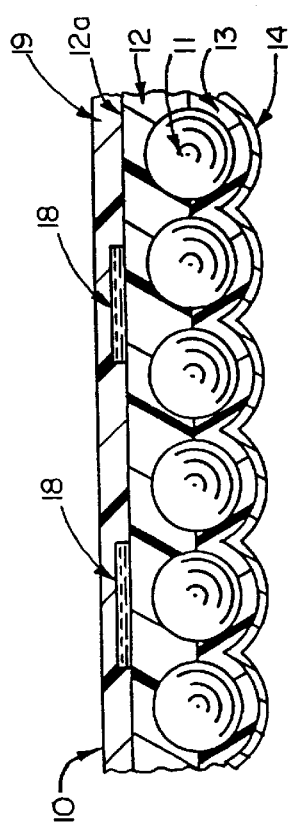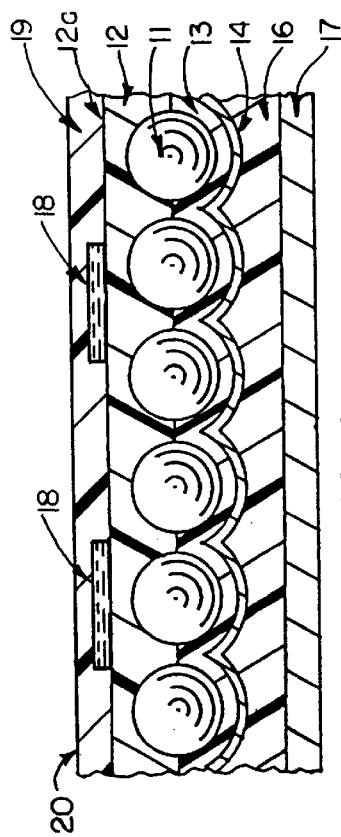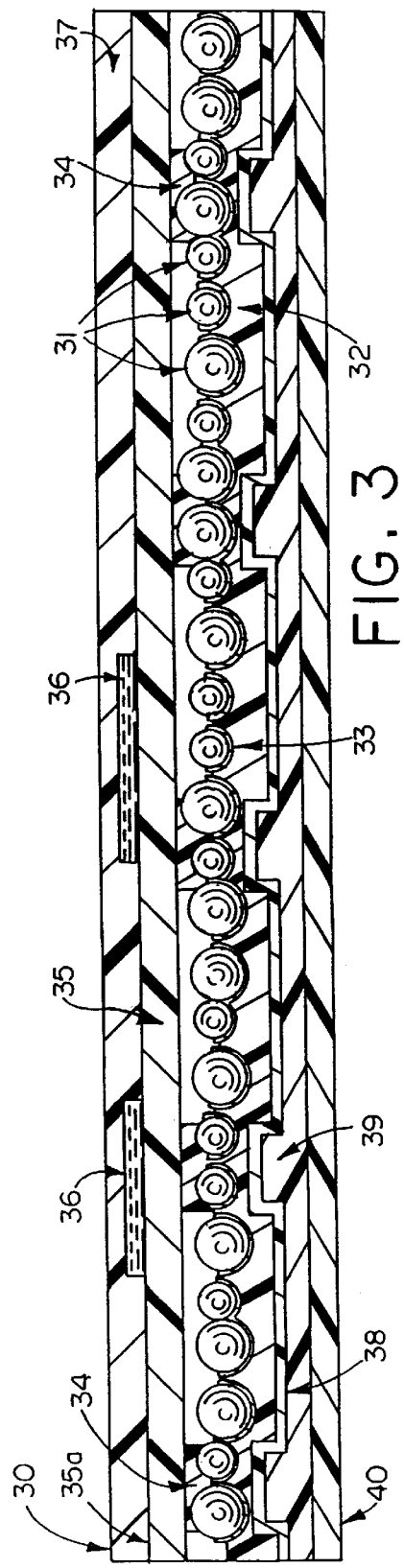

FILM FORMING MIXTURES, IMAGE BEARING FILMS AND IMAGE BEARING RETROREFLECTIVE SHEETING

FIELD OF THE INVENTION

The present invention relates to aliphatic polyurethane film forming mixtures, image bearing films and to image bearing retroreflective sheeting. More particularly, the invention relates to image bearing embedded or enclosed lens retroreflective sheeting and to image bearing encapsulated-lens retroreflective sheeting.

BACKGROUND OF THE INVENTION

There are several types of retroreflective sheeting including exposed lens, embedded or enclosed lens, and encapsulated lens retroreflective sheeting. In general, retroreflective sheeting comprises a multiplicity of lens elements and a reflector located behind the lens elements. Lens elements may be, for example, glass or ceramic microspheres, or microprisms in a polymeric base sheet. The reflector may be a layer of reflective metal such as aluminum which has been vapor-deposited on the lens elements or at some other location behind the lens elements, or flakes of reflective metal embedded in a binder layer, etc.

Exposed lens retroreflective sheeting generally comprises a polymeric binder film in which a multiplicity of lens elements such as glass microspheres are partially embedded, and a reflecting means is disposed on the backside of the embedded lens elements. Embedded or enclosed lens retroreflective sheeting generally comprises glass or ceramic beads completely embedded in a polymer binder film or multiplicity of films. A mirror or reflective surface, generally formed from a metallic vapor coat is formed on the backside of the polymer/bead composite. In a typical operation, light passes through the beads which individually act as lenses focusing the light and directing the light against the mirrored surface. The light is then reflected back through the beads and toward the source. Typically, the mirror surface is separated from the glass beads by a spacing layer or "space coat" which provides the desired focal length between the beads and the reflective surface. Thus, the elements of a typical enclosed or embedded lens retroreflective sheeting are: lens arrangement (beads embedded in polymer), spacing layer (space coat), and reflector surface (vapor coat). The sheeting may include other elements such as a transparent covering layer conforming to the front extremities of the lens elements and having a flat front face, and an optional transparent top layer for improving weatherability.

Encapsulated-lens retroreflective sheeting generally is formed from (1) a base sheet comprising retroreflective elements (glass beads) partially embedded in a binder layer and (2) a cover sheet. The cover sheet is sealed to the base sheet along a network of interconnecting bonds to form hermetically sealed cells containing protected retroreflective elements having an air-interface between the glass beads and the cover sheet.

Retroreflective sheeting has many applications. For example, enclosed lens retroreflective sheeting may be applied to a substrate such as wood, plastic or metal, and used to form highway signs, license plates, safety signs and reflectors. In many of these applications, depending upon the application of the retroreflective sheet, the sheeting should be characterized by one or more of the following properties: reflectivity, embossability, printability, flexibility, etc.

A number of polymer resins have been suggested as useful in forming the transparent cover film and protective topcoat on retroreflective sheeting. When the retroreflective sheeting is to be formed such as by embossing, the protective topcoat is generally a thermoplastic resin. Plasticized polyvinyl chloride resins, for example, have been used as transparent topcoats. U.S. Pat. Nos. 4,767,659 and 4,664,966 describe thermoplastic polymer topcoats selected from (a) one or more aliphatic urethanes, (b) one or more copolymers of monomers comprising by weight a major proportion of at least one of ethylene and propylene and a minor proportion of another monomer, and (c) homopolymers of ethylene or propylene. A preferred aliphatic urethane described in this patent is prepared from an aliphatic polyfunctional isocyanate and a polyfunctional hydroxyl-containing polymer. U.S. Pat. Nos. 4,505,967 and 4,950,525 describe elastomeric retroreflective sheeting wherein the cover layer may comprise a thermoplastic elastomeric aliphatic polyurethane. U.S. Pat. No. 4,808,471 describes a flat transparent topcoat for retroreflective sheeting which is as tough and as resistant to solvent and abrasion as alkyd resins and is weather-resistant like acrylic polyesters. The topcoat described in the '471 patent is made from a mixture of a hydroxy-functional acrylic polyol and a curing agent which is an aliphatic polyfunctional isocyanate.

In U.S. Pat. Nos. 4,755,425, 4,844,976 and 5,073,404, the patentee describes retroreflective sheeting which is coated with a mixture of silica in a transparent polymer selected from the group consisting of aliphatic polyurethanes and polyvinyl chloride copolymers having a minor amount of a comonomer containing at least one carboxylic acid or hydroxyl moiety. The silica comprises from 10 to 80 weight percent of the transparent protective coating. The silica-containing coating is described as providing superior soil and dew-repellency and is reported to retain a higher percentage of original brightness after exposure to dirt and/or dew conditions.

U.S. Pat. No. 5,117,304 describes flexible retroreflective articles based upon an optically clear aliphatic polyurethane polymer containing a plurality of hard chain segments. These polyurethanes are used in the formation of the retroreflective elements of the article.

U.S. Pat. No. 5,514,441 describes retroreflective sheeting of the enclosed type having an improved topcoat layer or cover sheet which is an aliphatic polyurethane. The aliphatic polyurethane topcoat is obtainable from a mixture comprising (A) an aliphatic polyurethane derived from an aliphatic polyisocyanate and a polyester polyol and (B) cellulose acetate butyrate. The mixture may also contain (C) at least one non-reactive solvent, and, optionally, (D) one or more surfactants including, for example, hydroxy-containing non-silicone surfactants such as hydroxyalkyl imidazoline surfactants.

SUMMARY OF THE INVENTION

Aliphatic polyurethane film forming mixtures, image bearing aliphatic polyurethane films, and image bearing retroreflective sheeting having such image bearing films are described. The image-bearing aliphatic polyurethane films of the invention comprise an aliphatic polyurethane film derived from a film-forming mixture comprising (A) an aliphatic polyurethane, and (B) at least one hydroxy-containing imidazoline surfactant represented by the formula

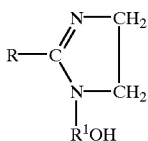

wherein R is an aliphatic group containing from about 10 to about 22 carbon atoms and $R^1$ is an alkylene group containing from 1 to about 3 carbon atoms, said film having printed thereon either a monocolor image and a clear overcoat or a multicolor image with or without a clear overcoat wherein the monocolor image is derived from at least one UV radiation curable ink which is cured prior to application of the clear overcoat, and the multicolor image is derived from at least two UV radiation curable inks applied sequentially with curing after each ink application and before application of any clear overcoat.

The retroreflective sheetings described herein and having the image bearing aliphatic urethane cover sheets or films may be enclosed lens or encapsulated lens retroreflective sheetings. The images may be single color images or multicolor images derived from UV radiation curable inks and, the images optionally coated with a UV cured clear overcoat.

BRIEF DESCRIPTION OF THE DRAWINGS

FIG. 1 is an enlarged schematic cross-section through an enclosed lens retroreflective sheeting of the invention.

FIG. 2 is an enlarged schematic cross-section through another enclosed lens retroreflective sheeting of the invention.

FIG. 3 is an enlarged schematic cross section through an encapsulated retroreflective sheeting of the invention.

DESCRIPTION OF THE PREFERRED EMBODIMENTS

The image bearing retroreflective sheeting of the present invention contains an aliphatic polyurethane topcoat or cover sheet obtainable from the film-forming mixture comprising (A) an aliphatic polyurethane; (B) at least one hydroxy-containing imidazoline as described more fully below, and optionally (C) cellulose acetate butyrate. The topcoat is a transparent protective coating which is printable particularly with UV radiation curable inks. The retroreflective sheeting itself comprises several layers, and the terms "topcoat" or "cover sheet" will be used interchangeably herein to designate the first film in an enclosed lens reflective sheeting which is a transparent layer (which may contain transparent pigments) overlying and conforming to the top extremities or surfaces of the lens elements and has a flat top face or surface. In an encapsulated lens retroreflective sheeting, the terms "topcoat" or "cover sheet" are used interchangeably herein to designate the first film which is disposed in spaced relationship from the layer of retroreflective elements and which is adhered to the base sheet containing the retroreflective elements through a network of intersecting bonds. This first film (cover sheet) can comprise more than one layer in some embodiments, and may contain transparent pigmentation for applications requiring color sheeting products. The term "spacing layer" or "space coat" is used herein to generally refer to the resin layer in an enclosed lens sheeting which underlies and contacts the bottom surfaces of the lenses, and has a back surface or bottom face that is spaced from the bottom surface of the lenses which bears the reflective coat or reflective surface.

In one embodiment the image bearing polyurethane films of the invention comprise an aliphatic polyurethane film derived from a film-forming mixture comprising
(A) an aliphatic polyurethane, and
(B) at least one hydroxy-containing imidazoline represented by the formula

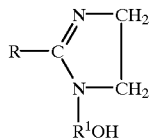

wherein R is an aliphatic group containing from about 10 to about 22 carbon atoms and $R^1$ is an alkylene group containing from 1 to about 3 carbon atoms, said film having printed thereon either a monocolor image and a clear overcoat or a multicolor image with or without a clear overcoat wherein the monocolor image is derived from at least one UV radiation curable ink which is cured prior to application of the clear overcoat, and the multicolor image is derived from at least two UV radiation curable inks applied sequentially with curing after each ink application and before application of any clear overcoat. Optionally, and preferably, the film-forming mixture also comprises (C) a cellulose acetate butyrate.

The aliphatic polyurethanes which are included in the film-forming mixtures used to form the aliphatic polyurethane films, topcoat or cover sheet are derived from an aliphatic polyisocyanate and a polyfunctional active hydrogen compound. The aliphatic polyisocyanates which may be utilized to derive the aliphatic polyurethane topcoats may be any of the known aliphatic polyisocyanates used to form urethane resins and are preferably aliphatic polyisocyanates without any aromatic polyisocyanate.

The aliphatic polyisocyanates useful in preparing the aliphatic polyurethanes used in the present invention may generally correspond to the formula $$Q(NCO)_x \qquad (I)$$

in which x is at least 2 and Q represents a di-, tri-, or tetravalent-aliphatic hydrocarbon group containing from 2 to 100 carbon atoms and 0 to 50 heteroatoms or a cycloaliphatic hydrocarbon group containing from 4 to 100 carbon atoms and 0 to 50 heteroatoms. The heteroatoms that can be present in Q include non-peroxidic oxygen, sulfur, non-amino nitrogen, halogen, silicon and phosphorus.

Examples of polyisocyanates represented by Formula I include ethylene diisocyanate, 1,4-tetramethylene diisocyanate, 1,6-hexamethylene diisocyanate (HDI), 1,12-dodecane diisocyanate, cyclobutane, 1,3-diisocyanate, 1-isocyanato-3,3,5-trimethyl-5-isocyanato methyl cyclohexane, bis(4-isocyanato cyclohexyl)methane, isophorone diisocyanate (IPDI), bis(4-isocyanatocyclohexo) methane; 4,4'-methylene-dicyclohexyl diisocyanate; 1,6-diisocyanato-2,2,4,4-tetramethylhexane; 1,6-diisocyanato-2,4,4-trimethylhexane; cyclohexane-1,4-diisocyanate; etc. Desmodur H® from Miles Inc. is described as HDI having an NCO content of 50%, and Desmodur W from Miles Inc. is described as bis (4-isocyanato-cyclohexyl)methane containing 32% of NCO.

Higher molecular weight aliphatic polyisocyanates also are useful and are often preferred because the diisocyanates are toxic and raise industrial hygiene concerns. Examples of polyisocyanates include adducts, prepolymers and isocyanate trimers. For example, the trimethylol propane adducts of the various monomeric isocyanates such as HDI and isophorone diisocyanate (IPDI) are useful. Biurets of the diisocyanates also are useful and are commercially available. For example, the biuret of HDI is available as Desmodur N from Miles Inc. Desmodur N-75 and Desmodur N-100 are examples of commercially available biuret of HDI, and Desmodur Z-4370 is a biuret of IPDI. Both of these materials are available from Miles Inc.

Aliphatic diisocyanates also can be converted to trimers that contain an isocyanurate ring. Trimers of HDI are available commercially from Miles under the trademarks Desmodur N-3300 and Desmodur N-3390.

The polyfunctional active hydrogen compounds which may be reacted with the alipathic polyisocyanates include polyols, polyether polyols, polyester polyols, hydroxy-terminated polyesters, acrylic polyols, polyester amides, polycaprolactone polyols, etc. Polyester polyols and polyether polyols are preferred, and the polyols may comprise diols, triols, and combinations thereof. Polyether polyols are prepared by the polymerization of alkylene oxides with suitable initiators having active hydrogens in their structure. Examples of polyether diols include poly(oxyethylene) glycols and poly(oxypropylene)glycols. Examples of polyether triols include poly(oxypropylene)triol which are prepared by the base-catalyzed reaction of propylene oxide with low molecular weight triols such as trimethalol propane, glycerol, and 1,2,6-hexane triol.

Polyester polyols also are useful in preparing the aliphatic polyurethanes useful in the present invention. Polyester polyols are generally prepared by reacting one or more dicarboxylic acids such as adipic acid, glutaric acid, sebacic acid, suberic acid, azelaic acid, dodecanoic acid, succinic acid, cyclohexane dicarboxylic acid, phthalic acid, isophthalic acid, hexahydrophthalic acid, dimerized linoleic acid ("Dimer" acid), and/or their corresponding anhydrides with one or more diols and triols. Mixtures of the dicarboxylic acids also can be used. The glycols which are used in the preparation of the polyester polyols generally include ethylene glycol, 1,2-propylene glycol, 1,3-propanediol, 2-methyl-1,3-propanediol, 1,3-butylene glycol, 1,4-butylene glycol, 1,6-hexanediol, diethylene glycol, neopentyl glycol, and diethylene glycol. The triols are usually glycerine, 1,2,6-hexane triol, trimethalol propane, and trimethanol ethane. In some instances, pentaerythritol may be used.

In one embodiment, the polyester polyols useful in preparing aliphatic polyurethanes useful in this invention (A) are prepared from a mixture comprising (A-1) a dicarboxylic acid component comprising isophthalic acid as the major dicarboxylic acid in the component, and (A-2) a polyol component.

The mixture used to form the polyester polyol generally will comprise from about 40 to about 60 mole percent of the dicarboxylic acid component (A-1) and from about 40 to about 60 mole percent of the polyol component (A-2). In one preferred embodiment, the mixture comprises from about 42 to about 55 mole percent of the dicarboxylic acid component and from about 45 to about 58 mole percent of the polyol component.

The dicarboxylic acid component contains a mixture of dicarboxylic acids in which the isophthalic acid is the major dicarboxylic acid present. Generally, the mixture will contain (i) from about 40 to about 80 mole percent of isophthalic acid, (ii) from about 20 to about 50 mole percent of at least one dicarboxylic acid of the formula $$HOOC(CH_2)_nCOOH \quad \text{(II)}$$

wherein n is an integer from 2 to about 8, and (iii) from about 0 to about 20 mole percent of at least one other dicarboxylic acid or dicarboxylic acid anhydride selected from terephthalic acid, phthalic acid, phthalic acid anhydride, tetrahydrophthalic acid, tetrahydrophthalic acid anhydride, hexahydrophthalic acid and hexahydrophthalic acid anhydride.

In another embodiment, the dicarboxylic acid component comprises (i) from about 40 to about 60 mole percent of isophthalic acid, (ii) from about 30 to about 50 mole percent of at least one dicarboxylic acid of Formula II, and (iii) from 0 to about 10 mole percent of at least one other dicarboxylic acid or dicarboxylic acid anhydride as specified above.

Examples of dicarboxylic acid mixtures particularly useful in the present invention include: a mixture of isophthalic acid and adipic acid; a mixture of isophthalic acid, adipic acid, and phthalic acid or phthalic acid anhydride; a mixture of isophthalic acid, azelaic acid and terephthalic acid; a mixture of isophthalic acid, succinic acid and hexahydrophthalic acid anhydride; a mixture of isophthalic acid and sebacic acid; a mixture of isophthalic acid, adipic acid and tetrahydrophthalic acid anhydride; etc.

The polyol component of the mixture used to form the polyester polyols generally contains (iv) from about 70 to about 90 mole percent of 1,6-hexanediol and (v) from about 10 to about 30 mole percent of at least one higher hydric polyol. Generally the higher hydric polyol is selected from the group consisting of trimethylolpropane, glycerol, pentaerythritol, and mixtures thereof. Specific examples of the polyol component mixtures include mixtures of: 1,6-hexanediol and glycerol; 1,6-hexanediol and pentaerythritol; 1,6-hexanediol and trimethylolpropane; 1,6-hexanediol, trimethylolpropane and glycerol; etc.

The preparation of the polyester polyols from the dicarboxylic acid component (A-1) and the polyol component (A-2) described above can be carried out in a known manner by methods described in the prior art. The esterification is optionally carried out in the presence of a catalytic quantity of a conventional esterification catalyst such as acids, bases, or transition metal compounds such as titanium tetrabutylate at temperatures of from about 80° C. to about 260° C., more often from about 100° C. to about 200° C. The esterification reaction is continued until the desired values for the hydroxyl number and acid number are obtained.

In another embodiment, the polyester polyols useful in this invention may be derived from phthalic acid or anhydride and a mixture of at least one diol and at least one triol such as a mixture of 1,6-hexanediol and glycerine or a mixture of 1,4-hexanediol and trimethylol propane. The useful polyester polyols also may comprise of mixture of polyester polyols wherein one is derived from the reaction of a dicarboxylic acid with a diol or triol, and the other is derived from the reaction of a dicarboxylic acid (same or different) with a mixture of a diol and a triol.

In another embodiment, the polyester polyol may be obtained by reaction of one or more aliphatic dicarboxylic acids such as adipic, suberic, azelaic or 1,2-cyclohexane dicarboxylic acid etc. with a diol, triol or mixture of diol and triol as described above.

The polyester polyols utilized in the present invention generally have hydroxyl numbers in the range of from about 80 to about 250, and more often from about 100 to about 200, acid numbers below about 12, preferably from 0.1 to about 10, and a number average molecular weight (Mn) of from about 800 to about 6000, more often from about 800 to about 3000. The polyester polyols generally are highly viscous, colorless clear resins which are soluble in solvents such as toluene, ethyl acetate, butyl acetate, methyl glycol acetate, ethyl glycol acetate, propylene glycol methyl ether acetate (pm acetate) methyl ethyl ketone, methyl isobutyl ketone, etc.

The following examples illustrate the preparation of some polyester polyols useful in the present invention. Unless otherwise indicated in the following examples and elsewhere in the specification and claims, all parts and percentages are by weight, temperatures are in degrees centigrade, and pressures are at or near atmospheric pressure.

EXAMPLE 1

A mixture of 560 grams (4.75 moles) of 1,6-hexanediol, 184 grams (2 moles) of glycerol, 481.4 grams (2.9 moles) of isophthalic acid, 320 grams (1.7 moles) of azelaic acid, and 191 grams (1.15 moles) of terephthalic acid is prepared in a reactor and heated to a temperature of from 100° C. to 150° C. After one or two hours, the temperature is gradually raised to 200° C. over a period of 4 to 8 hours while water is removed by distillation. During this period, the mixture becomes homogeneous and clear. A catalytic quantity of titanium tetrabutylate is then added, and esterification is continued at 200° C. under reduced pressure. The pressure is lowered to 10 to 20 mbar in the course of 6 to 8 hours, and stirring is continued under these conditions until the desired acid number (8) has been reached. The polyester polyol is recovered and is found to have a hydroxyl number of 149, an average functionality of about 4 and an average molecular weight of about 1530. The polyester contains 54 mole percent of the polyol components, and 46 mole percent of the dicarboxylic acid component.

EXAMPLE 2

The procedure of Example 1 is repeated except that the mixture charged to the reactor contains 380.6 grams (3.2 moles) of 1,6-hexanediol, 54.4 grams (0.4 mole) of pentaerythritol, 348.6 grams (2.1 moles) of isophthalic acid, and 106.2 grams (0.53 mole) of sebacic acid. The polyester polyol prepared in this manner is found to have a hydroxyl number of 187, an acid number of 5, an average functionality of about 2.8 and an average molecular weight of about 800. This polyester contains 58 mole percent of the polyol component and 42 mole percent of the dicarboxylic acid component.

The polyester polyols useful in forming the aliphatic polyurethanes utilized in the present invention are described in, for example, U.S. Pat. No. 4,656,243 (Pedain et al), and the disclosure of this patent relating to polyester polyols and methods of preparing polyester polyols is hereby incorporated by reference. Useful polyester polyols also are commercially available. Desmophen 670A-80 is available as a solution in n-butyl acetate (80% solids) from the Miles Industrial Chemical Division of Miles Inc., Pittsburgh, Pa. This polyester polyol is believed to be derived from a mixture comprising isophthalic acid, 1,6-hexanediol, trimethyol-propane and phthalic acid or phthalic acid anhydride and is characterized as having an equivalent weight of about 500, an acid number of 2.0 maximum and a hydroxyl number of about 104 to about 112. Other polyester polyols are available from Miles under the general trade designation Desmophen and Multron.

A number of useful polyester polyols also are available from Ruco Polymer Corporation, Hicksville, N.Y. under the general designation Rucoflex®. For example, Rucoflex S-1028 is a polyester of the reaction of phthalic anhydride with 1,6-hexanediol; Rucoflex S-101 is a polyester of adipic acid and ethylene glycol; Rucoflex S-1037 is a polyester of adipic acid and a mixture of ethylene glycol and 1,4-hexaneodiol; Rucoflex S-1022 is a polyester of a mixture of adipic acid, isophthalic acid and diethylene glycol; Rucoflex S-1035 is a polyester of a mixture of azelaic acid, isophthalic acid and 1,6-hexanediol; Rucoflex S-2300 is a polyester of a mixture of adipic acid, 1,6-hexanediol, and trimethylol propane; Rucoflex F806P is a solution of a mixture of (1) a polyester of phthalic anhydride, 1,6-hexanediol and glycerine, (2) a polyester of phthalic anhydride and 1,6-hexanediol, (3) propylene glycol methylether acetate (PM acetate) and (4) ethyl acetate; and Rucoflex XF4910-2 is a solution of a mixture of a polyester of azelaic acid and cyclohexane dicarboxylic acid with 1,6-hexanediol and trimethylol propane and a polyester of phthalic anhydride and 1,6-hexanediol in PM acetate and ethyl acetate.

Aliphatic polyurethanes can be prepared from the aliphatic polyisocyanates and polyester polyols described above by techniques described in the art. Generally, the preparation of the polyurethanes involves reaction of the polyester polyol and the aliphatic polyisocyanate, preferably using an excess of the polyisocyanate. An extensive description of some of these techniques for preparing polyurethanes can be found in J. H. Saunders and K. C. Frisch, *Polyurethanes: Chemistry and Technology Part II*, Interscience (New York, 1964), especially on pages 8–49 and in the various references cited therein. The preparation and properties of polyurethanes also are described by E. N. Doyle in *The Development and Use of Polyurethane Products*, McGraw-Hill, 1971.

Particularly preferred aliphatic diisocyanates for preparing polyurethanes which have optimal low temperature flexibility, exterior durability and reduced tendency to yellow include 4,4'-methylene-dicyclohexyldiisocyanate, cyclohexane-1,4-diisocyanate, hexamethylene-1,6-diisocyanate, isophorone diisocyanate, tetramethylene-1,4-diisocyanate, etc. In one particular embodiment, the biuret of hexamethylene-1,6-diisocyanate is utilized which is available commercially from Bayer under the designation Desmodur N-100 (100% solids) and Desmodur N-3200 (100% solids).

The equivalent ratio of polyisocyanate to polyol may vary between the slight excess of the polyisocyanate to a large excess of the polyisocyanate. Thus equivalent ratios of from about 0.7:1.00 NCO/OH up about 4:1 may be used. Generally, the equivalent ratio ranges from about 0.9:1 to 1.5:1, and the ratio is preferably from about 1.01:1 to 1.20:1.

A catalyst is generally included to promote the reaction between the polyisocyanate and the polyester polyol. A variety of catalysts are described by Doyle in *The Development and Use of Polyurethane Products*, supra, and preferred catalysts are those such as tin, zinc, manganese, cobalt and zirconium compounds. Tertiary amines may also be used. Metal catalysts of tin and zinc are particularly preferred, and dibutyl tin dilaurate and dibutyl tin sulfide are particularly preferred. The catalyst generally may be present in amounts of about 0.001% to about 1% by weight based on the solids content of the formulations.

Polymerization mixtures generally will contain one or more solvents which are inert to the reaction mixture. The solvent should be sufficiently low boiling so that it will vaporize when coated onto a surface in a thin film. Preferred solvents include low boiling esters such as ethyl acetate, butyl acetate, amyl acetate, 2-ethoxyethyl acetate, PM acetate, 2-(2-ethoxy)ethoxyethyl acetate, 2-butoxyethyl acetate and other similar esters, hydrocarbons such as heptane, toluene and xylene, ketones, chlorinated solvents, nitro aliphatic solvents, dioxane, etc. The amount of solvent in the polymerization mixture may be varied over a wide range such as from about 3% to about 50% by weight.

The aliphatic polyurethane film-forming mixtures useful in the present invention also comprises (B) at least one hydroxyalkyl imidazoline such as represented by formula III.

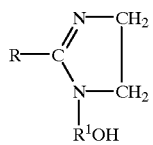

(III)

wherein R is an aliphatic group containing from about 10 to about 22 carbon atoms, preferably for about 12 to about 20 carbon atoms, and $R^1$ is an alkylene group containing from 1 to about 3 carbon atoms. Generally, R is a fatty alkyl group derived from fatty acids such as oleic acid, stearic acid, lauric acid, tall oil, coconut oil, etc. A series of useful hydroxyalkyl imidazoline surfactants are available from Calgene Chemical Inc. under the general designation Hodag C-100 series. In the C-100 series, $R^1$ in the above formula is an ethylene group and R represents an oleic group (C-100-O) or a stearic group (C-100-S) or a lauric group (C-100-L) or a tallate group (C-100-T). Hydroxy-containing imidazolines of Formula III also are available from Rhone Poulenc under the general trade designation Miramine®. For example, Miramine C is identified as coconut hydroxyethyl imidazoline; Miramine O is oleyl hydroxyethyl imidazoline, and Miramine TO is tall oil hydroxyethyl imidazoline. These imidazoline derivatives have been found to be particularly useful even when present in small amounts such as 0.01% by weight on a dry basis in the mixtures used to form the aliphatic polyurethane topcoat in accordance with the present invention. Generally the imidazoline derivatives may be present in the film forming mixture in amounts of from 0.01 to about 0.2% by weight or more, and more often in amounts of from 0.02 to 0.1% by weight.

The film-forming mixture used to form the aliphatic urethane films also, may, and preferably does contain (C) cellulose acetate butyrate. The cellulose acetate butyrate is incorporated into the mixture to control the rheology of the polymer, and the aliphatic polyurethane film which is obtained with the urethane mixtures containing cellulose acetate butyrate are further characterized as smooth, level and essentially free of holes. The amount of cellulose acetate butyrate contained in the mixture used to form the polyurethane topcoat may vary over a wide range but is generally within the range of from about 0.01% to about 5% by weight.

The butyryl group content of the cellulose acetate butyrates which are particularly useful in the present invention may range from about 30% by weight up to about 60% by weight. In one preferred embodiment, the cellulose acetate butyrate used in the invention contains from about 40% to about 55% by weight of butyryl groups. Cellulose acetate butyrate CAB-381 available from Eastman Chemical Company has a butyryl content of from about 38% and an acetyl content of about 13.5%, and CAB-551-0.2 has an average butyryl content of about 52 weight percent (minimum 49 weight percent), and an acetyl content of about 2% (maximum 4 weight percent).

The film-forming urethane mixture also may contain, and generally does contain (D) at least one non-reactive solvent such as toluene, ethyl acetate, butyl acetate, PM acetate, etc. The amount of solvent present in the film-forming mixture may vary over a wide range, but the amount of solvent generally will be in the range of from 0% to about 70% by weight and more often from about 20% to about 35% by weight. The actual amount of solvent required will vary with selected processing methods.

Inhibitors, antioxidants and ultraviolet absorbers or light stabilizers also may be included in the urethane formulations provided they do not add color to the formulations. Particularly useful ultraviolet absorbers, inhibitors and antioxidants include benzotriazole derivatives, hydroxy benzophenones, esters of benzoic acids, oxalic acid, diamides, etc. Various benzotriazole derivatives useful as ultraviolet absorbers and stabilizers are described in U.S. Pat. Nos. 3,004,896; 4,315,848; 4,511,596; and 4,524,165. Those portions of these patents which describe the various benzotriazole derivatives are incorporated herein by reference. Useful ultraviolet light stabilizers, inhibitors and antioxidants are available from Ciba-Geigy Corporation under the general trade designation "Tinuvin." For example, Tinuvin 328 is described as an ultraviolet absorber which is identified as 2-(2'-hydroxy-3', 5'-di-tert-amylphenyl) benzotriazole, and Tinuvin 292 is a hindered amine light stabilizer identified as bis(1,2,2,6,6-pentamethyl4-piperidinyl) sebacate.

In addition to the hydroxy-containing imidazoline surfactants (B) described above, other surfactants may included in the polyurethane formulations, and a variety of surfactants have been found to be useful. For example, surfactants utilized in the urethane formulations of the present invention may include non-hydroxy functional non-silicone and non-hydroxy functional non fluoropolymer based surfactants. Various amounts of one or more of such surfactants may be included, and generally, the mixture used to form the aliphatic polyurethane topcoat of the present invention will contain from about 0.0005 to about 5% by weight of the additional surfactant, and more often from 0.0005 to 0.01%. Silicone based and fluoropolymer based surfactants are generally not useful in the urethane formulations of this invention at the above concentrations when the films derived from the urethane formation are to be printed with a UV radiation curable ink.

The film-forming urethane mixtures of the invention may contain other conventional additives such as color stabilizers, pigments, extenders, plasticizers, fillers, etc. Although fillers such as silica can be included in the mixtures and in the films, the films are generally free of silica and other inorganic particulate fillers.

The appropriate physical properties of the aliphatic urethane films useful in one embodiment of the invention as represented by Examples 3 and 4 are shown in Table I. The physical properties of the aliphatic urethane films useful in another embodiment of the invention as represented by the following Example 5 is shown in Table 1A, and for another embodiment as represented by the following Example 6 is shown in Table IB.

TABLE I

|  | General Range | Preferred Range |
|---|---|---|
| Elongation: | 70–160% | 100–130% |
| Yield Tensile: | 0–1500 psi | 0–500 psi |
| Break Tensile: | 500–3500 psi | 1000–2500 psi |

TABLE IA

|  | General Range | Preferred Range |
|---|---|---|
| Elongation: | 5–120% | 10–90% |
| Yield Tensile: | 2500–4000 psi | 2700–3500 psi |
| Break Tensile: | 1700–5700 psi | 2700–5000 psi |

TABLE IB

|  | General Range | Preferred Range |
|---|---|---|
| Elongation: | 30–120% | 40–100% |
| Yield Tensile: | 600–2400 psi | 1000–2000 psi |
| Break Tensile: | 1000–4000 psi | 1000–3500 psi |

The following examples 3–6 illustrate mixtures useful for forming the aliphatic polyurethane films and topcoats in accordance with the present invention. The mixtures can be used by one skilled in the art to prepare films and topcoats. It is most effective to prepare the mixtures by forming pre-batches. Typically, pre-batches of UV stabilizers, color dispersions (if any), catalyst, flow agents (including surfactants), base polyol and the base diisocyanate are used. To ensure more effective mixing, the total solvent used in compounding these materials is divided among the pre-batches such that pre-batch viscosity can be lowered to below 5,000 cps and preferably below 1,000 cps. Prior to coating, the base polyol is combined with each of the following pre-batches one at a time and allowed to mix for at least 30 minutes: UV stabilizer, color dispersions (if any), catalyst, and flow agents. This is typically called "Part A". The diisocyanate crosslinker pre-batch is designated as "Part B". Part A and Part B are subsequently mixed in line during processing according to the preferred and pre-designated A to B ratio. When compounded correctly, the desired NCO/OH ratio is maintained. The NCO/OH ratio in Example 3 is 1.05, the ratio in Example 4 is 1.2, and the ratio in Examples 5 and 6 is 1:1. In Examples 5 and 6, the A:B ratio is 2.19:1.

TABLE II

Examples 3–4

|  |  | Ex.3 | | Ex.4 |
|---|---|---|---|---|
| Components | Wt. % Solids | Wet Wt % | Dry Wt. % | Wet Wt. % |
| Desmophen 670A-80 | 80 | 61.2 | 68.0 | 65.4 |
| Desmodur N-100 | 85 | 23.3 | 27.5 | 30.3 |
| Butyl Acetate | 0 | 9.2 | 0 | — |
| Cellulose Acetate Butyrate |  |  |  |  |
| CAB 551 | 20 | 3.6 | 1.0 | 1.0 |
| Hodag C-100 T | 10 | 0.08 | 0.01 | 0.01 |
| Dibutyl tin sulfide | 10 | 0.033 | 0.005 | 0.005 |
| 2,4-pentanedione (inhibitor) | 0 | 0.13 | 0 | 0.13 |
| Tinuvin 292 | 100 | 1.4 | 1.9 | 1.8 |
| Tinuvin 327 | 100 | 1.1 | 1.5 | 1.5 |

TABLE III

Examples 5–6

|  |  | Example 5 | | Example 6 | |
|---|---|---|---|---|---|
| Components | % Solids | Wet wt % | Dry wt % | Wet wt % | Dry wt % |
| Part A |  |  |  |  |  |
| Rucoflex F-806P | 80 | 50.84 | 60.19 | — | — |
| Rucoflex XF 4910 | 80 | — | — | 50.84 | 60.19 |
| Hodag C-100 T | 100 | 0.04 | 0.06 | 0.04 | 0.06 |
| CAB 381 | 100 | 1.63 | 2.41 | 1.63 | 2.41 |
| Butyl Acetate | 0 | 2.90 | 0 | 2.90 | 0 |
| PM Acetate | 0 | 6.60 | 0 | 6.60 | 0 |
| Toluene | 0 | 3.52 | 0 | 3.52 | 0 |
| Dibutyl tin sulfide | 100 | 0.002 | 0 | 0.002 | 0 |
| Tinuvin 378 | 100 | 1.15 | 1.70 | 1.15 | 1.70 |
| Tinuvin 292 | 100 | 1.43 | 2.12 | 1.43 | 2.12 |
| 2,4-pentanedione (Inhibitor) | 0 | 0.54 | 0 | 0.54 | 0 |
| Part B |  |  |  |  |  |
| Desmodur N-100 | 85 | 26.65 | 33.52 | 26.65 | 33.52 |
| PM Acetate | 0 | 4.70 | 0 | 4.70 | 0 |

The aliphatic polyurethane film-forming mixtures (formulations) described above can be used in the preparation of films which are readily susceptible to printing with ultraviolet (UV) radiation curable inks in a one pass operation to form a monocolor image, or in a multipass system to form a multicolor image (including process color printing) on the surface of the film. It has now been discovered that it is possible using the aliphatic polyurethane films prepared in accordance with the present invention to (1) deposit a UV radiation curable color image on the surface of the polyurethane film, (2) cure the deposited image with ultraviolet light, (3) deposit a second UV radiation curable color image on top of the first color image or on the film or both on the first color image and the film, and (4) cure the second color image with UV radiation. The second color which is deposited adheres both to the first color image and to the polyurethane film on those parts of the polyurethane film not previously covered by the first color image. In contrast, when the aliphatic polyurethane film does not contain at least one hydroxy-containing imidazoline component (B) as required in the present invention, a different result is obtained. When a first color image is deposited on the aliphatic polyurethane film and cured, and an attempt is made to deposit a second UV curable color image on the film containing the first color image which has been UV cured, the second image will adhere to the first color image, but the adhesion of the ink to the portions of the polyurethane film not bearing the first color image is sporadic and generally unacceptable.

In another embodiment of the present invention, a UV radiation curable color image is deposited on the polyurethane film and cured. Subsequently, a UV radiation curable clear or transparent overcoat film is deposited over the image bearing polyurethane film, and the clear or transparent UV radiation curable film can then be cured and will adhere well to the image bearing polyurethane film. In contrast, if the hydroxy-containing imidazoline in the polyurethane film is replaced with a different surfactant, and the same procedure is followed, the UV radiation curable transparent or clear overcoat will not adhere consistently to the portion of the polyurethane film which has not been printed or coated with the image.

The images which are printed or deposited on the aliphatic polyurethane films in accordance with the present invention may be clear, transparent, or opaque and may be monocolor (e.g., black, blue, red, etc.) or multicolor (e.g., black and white, red and blue, etc.). The images may be of any form such as a picture or representation of a particular person, place, or thing, logos, numbers, etc. such as may be used on a license plate, road sign, etc.

The images may be deposited or printed on the surfaces utilizing any of the well known ultraviolet radiation curable inks which generally include a photopolymerizable composition (a binder), at least one photoinitiator, a pigment, a pigment dispersant, typically an ultraviolet absorber, and optional components such as flow adjusters, defoamers, leveling agents, etc. Preferably, the UV radiation curable ink is formulated in a manner to minimize shrinkage on curing so that the adhesion of the ink to the urethane film is not deteriorated and the image is not deformed. The UV radiation curable printing inks also should be selected to provide acceptable adhesion and chemical resistance.

The ultraviolet radiation curable inks useful in the invention generally comprise a binder which comprise one or more photopolymerizable monomers. The photopolymerizable monomers generally are ethylenically unsaturated compounds. The unsaturated compounds may contain one or more olefinic double bonds, and they may be low molecular weight compounds, (monomeric) or high molecular weight compounds (oligomeric). Illustrative examples of monomers containing one double bond are acrylates such as alkyl(meth)acrylates or hydroxyalkyl(meth)acrylates such as methyl-, ethyl-, butyl-, 2-ethylhexyl- or 2-hydroxyethylacrylate, isobornylacrylate, methyl- or ethylmethacrylate. Further examples of photopolymerizable monomers are acrylonitrile, acrylamide, methacrylamide, N-substituted (meth) acrylamides, vinyl esters such as vinyl acetate, vinyl ethers such as isobutylvinyl ether, styrene, alkylstyrenes and halostyrenes, N-vinylpyrrolidone, vinyl chloride or vinylidene chloride.

Monomers containing a plurality of double bonds are typically the diacrylates of ethylene glycol, 1,3-propylene glycol, 1,4-butaneodiol, 1,4-cyclohexane diol, neopentyl glycol, hexamethylene glycol, or bisphenol A polyacrylates such as trimethylolpropane triacrylate and pentaerythritol triacrylate or tetraacrylate, vinyl acrylate, divinyl benzene, divinyl succinate, diallyl phthalate, triallylphosphate, triallylisocyanurate or tris(2-acryloyloxy)ethyl-isocyanurate.

Typical examples of high molecular weight (oligomeric) polyunsaturated compounds are acrylated epoxy resins, acrylated polyethers, acrylated polyurethanes or acrylated polyesters. Further examples of unsaturated oligomers are unsaturated polyester resins which are normally prepared from maleic acid, phthalic acid and one or more diols and which have molecular weights of ca. 500 to 3000. Such unsaturated oligomers may also be referred to as prepolymers. Single component systems based on photocurable prepolymers are often used as binders for printing inks. Unsaturated polyester resins are normally used in two-component systems together with a monounsaturated monomer such as described above, preferably with styrene.

The unsaturated compounds also can be used in admixture with non-photopolymerisable film-forming components. These components may typically be drying polymers or their solutions in organic solvents, such as nitrocellulose. They may also, however, be chemically curable or thermocurable resins such as polyisocyanates, polyepoxides or melamine resins. The concomitant use of thermocurable resins is important for use in so-called hybrid systems which are photopolymerised in a first step and crosslinked by a thermal aftertreatmet in a second step.

The UV radiation curable inks also should contain at least one photoinitiator. A wide range of different photoinitiators is at present available for UV radiation curable systems. They include benzophenone and benzophenone derivatives, benzoin ethers, benzil ketals, dialkoxyacetophenones, $\alpha$-hydroxyacetophenones, $\alpha$-aminoacetophenones, $\alpha$-haloacetophenones or aroylphosphine oxides. They differ in that they have different absorption maxima. To cover a wide absorption range it is possible to use a mixture of two or more photoinitiators. The total amount of photoinitiator in the UV radiation curable compositions may be in the range of from about 0.05 to about 7 or 10% by weight of the total composition. Preferably the compositions contain from about 0.2% to about 5% by weight of the photoinitiator.

Amines may be added to accelerate the photopolymerisation, for example triethanolamine, N-methyl-diethanolamine, p-dimethylaminobenzoate or Michler's ketone. The photopolymerisation can further be accelerated by the addition of photosensitisers which displace or broaden the specral sensitivity. These photosensitisers are preferably aromatic carbonyl compounds such as thioxanthone, anthraquinone and 3-acyl-coumarin derivatives as well as 3-(aroylmethylene)-thiazolines.

Hindered amine light stabilizers (HALS) which function as co-stabilizers, also may be added to the UV radiation curable printing compositions used in the present invention. Examples of hindered amine light stabilizers include those listed and recited in U.S. Pat. Nos. 5,112,890 and 4,636,408, which are incorporated herein by reference. A specific example of a hinder amine light stabilizer useful in the printing inks is Tinuvin 292 which is identified as bis(1,2, 2,6,6-pentamethyl-4-piperidinyl) sebacate.

In addition to the above described binder materials and photoinitiators, the UV radiation curable inks used in the present invention also contain at least one coloring matter selected from organic pigments, inorganic pigments, body pigments and dyes which are known and have been used in this art. Examples of useful pigments include titanium dioxide, cadmium yellow, cadmium red, cadmium maroon, black iron oxide, chrome green, gold, silver, aluminum and copper. Examples of dyes include alizarine red, Prussion blue, auramin naphthol, malachite green, etc. Generally the concentration of the pigment or dye in the ink will be from about 5% to about 70% by weight.

The printing inks may also contain at least one UV absorber which provides weathering protection and helps prevent microcracking of the color image. The amount of UV absorber included in the UV radiation curable ink should be maintained at a practical minimum since the presence of the UV absorber may increase the curing rate. A variety of UV absorbers are known and useful in the present invention and these include UV absorbers belonging to the group of photopolymerisable hydroxybenzophenones and photopolymerisable benzotriazoles. U.S. Pat. No. 5,369,140 describes a class of 2-hydroxyphenyl-s-triazines that are useful as UV absorbers for radiation curable systems. The triazines are effective for stabilizing cured films when exposed to sunlight over a long period of time, and these stabilizers do not interfere with UV radiation curing of the inks. The triazine UV absorbers are effective in amounts of from about 0.1 to about 2% by weight. The UV absorbers may be used in combination with other light stabilizers such as sterically hindered amines. The disclosure of the '140 patent is hereby incorporated by reference for its disclosure of such UV absorber combinations. U.S. Pat. Nos. 5,559,163 and 5,162, 390 also describe UV absorbers which are useful in the inks of the present invention.

The UV radiation curable inks utilized in the present invention can be applied to the polyurethane film by conventional techniques such as screen printing, roller coat printing, flexo printing, gravure printing, brushing, spraying, dipping or coating, and multicolor applications are possible and desirable. After application of the ink to the urethane film, the inks are cured by irradiation in a UV exposure apparatus as is well known to those skilled in the art of printing and UV curing. UV light sources such as low pressure mercury lamps, high pressure mercury lamps, xenon lamps, arc lamps and gallium lamps are useful. It is also possible, but not necessary, to improve the curability of the ink by heating after irradiation.

As noted above, subsequent to the application of a color image and curing, a second color image can be superimposed on the first color image and/or the polyurethane film followed by curing, or a clear overcoat of a UV radiation curable film-forming mixture can be deposited over the color image and then cured with UV radiation. The UV radiation curable clear overcoat can be deposited over the color image from a UV radiation curable formulation which may be same as the UV radiation curable ink formulations described above except that the pigments and/or colorants are omitted from the formulations. The procedures for depositing the ink and clear formulations, and for curing of UV curable inks and clear overcoats are well known to those skilled in the art. One preferred method is screen printing where ink is forced by a squeegee though a print screen.

The aliphatic polyurethane film forming mixtures (formulations) described above can be used to form a transparent topcoat or cover sheet for all types of retroreflective sheeting to provide a desirable transparent topcoat or cover sheet having improved weatherability, embossability, reflectivity, printability, etc. In one preferred embodiment, the image bearing aliphatic polyurethane topcoats are used in embedded lens retroreflective sheeting which may include any of the various types of embedded lens reflective sheeting known in the art.

In one particular embodiment of the invention, the image bearing embedded lens retroreflective sheeting of the invention comprises (A) a monolayer of transparent microsphere lenses;

(B) a polymeric spacing layer underlying and contacting the bottom surfaces of the lenses and having a back surface that is spaced from the bottom surfaces of the lenses;

(C) a reflective layer having its top surface in contact with the back surface of the spacing layer; and (D) an aliphatic polyurethane topcoat or cover sheet overlying and conforming to the top surfaces of the lenses and having a flat top surface or face, said topcoat being obtainable from a film-forming mixture comprising (D-1) an aliphatic polyurethane, (D-2) at least one hydroxy-containing imidazoline represented by the formula

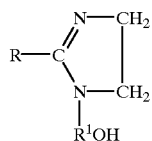

wherein R is an aliphatic group containing from about 10 to about 22 carbon atoms and $R^1$ is an alkylene group containing from 1 to about 3 carbon atoms, and, optionally (D-3) cellulose acetate butyrate, said cover sheet having printed thereon a multicolor image derived from at least two UV radiation curable inks applied sequentially with curing after each ink application. In addition, the embedded lens retroreflective sheeting may also comprise (E) a pressure-sensitive adhesive layer underlying and in contact with the reflective layer (C), and further optionally (F), a release liner underlying and in contact with the adhesive layer.

The coating weight of the polymeric spacing layer or space coat (B) may be from about 15 to 40 gms/m² and more often is from 20–30 gms/m². The coating thickness may range from about 0.5 to 1.5 mils. The coating weight of the polyurethane topcoat (D) may range from about 25 to 175 gms/m². Preferably the coating weight is about 50 to 150 gms/m² and more preferably is from about 60 to 120 gms/m². The topcoat thickness may range from 1 to about 5 mils and more often is from about 2–5 mils. When present, the thickness of the pressure-sensitive adhesion layer (E) will range from 0.2 to 5 mils and more often is from about 0.5 to 1.5 mils.

Two embodiments of the image bearing enclosed retroreflective sheeting of the present invention are illustrated in FIGS. 1 and 2 wherein like numbers are used to refer to identical elements. Thus, retroreflective sheeting 10 shown in FIG. 1 and the retroreflective sheeting 20 shown in FIG. 2 comprise a monolayer of glass microspheres 11 partially embedded in a transparent polymeric topcoat or cover sheet layer 12 having an upper surface 12A, and in a spacing layer 13 underlying the back surfaces of the microspheres 11. A reflective layer 14 (e.g., vapor deposited aluminum) is in contact with the back surface of the spacing layer 13. In FIG. 2, a pressure-sensitive adhesive layer 16 underlies and is in contact with the reflective layer 14, and a release liner 17 is in contact with the bottom surface of the pressure-sensitive adhesive layer 16. A discontinuous image 18 is adhered to the upper surface 12A of the topcoat layer 12, and a transparent covercoat 19 is over and in contact with the image and the topcoat layer 12.

Various thermoplastic polymeric resins have been used previously in forming the spacing layer of embedded lens retroreflective sheeting, and such resins can be used in the sheetings of the present invention. The resins that may be used for the spacing layer include a variety of partially amorphous or semi-crystalline thermoplastic polymers which generally have a soft stage during which the lenses can be embedded in the films. The material used to form the spacing film or layer should be compatible with the topcoat material and adapted to form a good bond with the topcoat (and the microsphere lenses). Preferably, the adhesion between the materials is greater than the tensile strength of the materials. Acrylics, polyvinyl butyrals, aliphatic urethanes and polyesters are particularly useful polymer materials because of their outdoor stability. Copolymers of ethylene and an acrylic acid or methacrylic acid; vinyls, fluoropolymers, polyethylenes, cellulose acetate butyrate, polycarbonates and polyacrylates are other examples of polymers that can be used for the cover and spacing layers of the sheeting of the invention. In one embodiment it is desirable to use materials having elastomeric properties to provide retroreflective sheeting which may be repeatedly stretched or flexed, and upon release of the stretching or flexing tension, rapidly return to substantially their original dimensions without significant loss of retroreflectivity. Certain polyolefins such as polyethylenes are available which possess such elastomeric propers and these materials can be used as space coat materials.

The transparent microsphere lenses utilized in the enclosed lens retroreflective sheeting of the present invention may be characterized as having average diameters in a range of from about 30 to about 120 microns, and more often in a range from about 40 to about 80 microns. The index of refraction of the microsphere lenses is generally in the range of from about 2.0 to about 2.5, more typically is in the range of from about 2.1 to about 2.2, and most often between about 2.10 to about 2.15. Glass microspheres are typically used although ceramic microspheres such as those made by sol/gel techniques can also be used. The index of refraction and the average diameter of the microspheres, and the index of refraction of the urethane topcoat and space coat dictate the thickness of the spacing film. The microspheres can be subjected to chemical or physical treatments to improve the bond of the microspheres to the polymeric films. For example, the microspheres can be treated with a fluorocarbon or an adhesion promoting agent such as an aminosilane to improve the bond, or the space coat layer in which the lenses have been embedded can be subjected to a flame treatment or corona discharge to improve the bond between the space coat and lenses to the subsequently applied topcoat.

As exemplified in FIG. 2, various other layers can be included in the sheeting of the invention in addition to those discussed above. For example, an adhesive layer can be applied over the reflective layer 14 to protect the reflective layer and to serve a functional purpose such as adhering the sheeting to a substrate. Conventional pressure-sensitive adhesives such as acrylic-based adhesives, or heat- or solvent-activated adhesives are typically used and may be applied by conventional procedures. For example, a preformed layer of adhesive on a carrier web or release liner can be laminated to the reflective layer. Conventional release liners can be utilized in the formation of the retroreflective sheeting of the present invention.

The enclosed lens retroreflective sheeting of the present invention can be made by procedures normally used in the industry. For example, the sheeting of the invention can be prepared by first extruding or casting a space coat layer of desired thickness on a polymer coated casting sheet and drying if necessary. The space coat layer is reheated to provide a tacky surface upon which microspheres are cascade-coated to form a monolayer of the microspheres. Typically, heat and/or pressure can be applied at this stage to facilitate bead embedding. The microspheres generally are embedded into the layer to a depth of about one-half of the average diameter of the microspheres. It is important that the space coat adapts a contour parallel to the bead layer. (See, for example, layer 13 in FIGS. 1 and 2). The aliphatic polyurethane topcoat film is then applied over the exposed microspheres by coating the exposed microspheres with one of the aliphatic polyurethane mixtures described above, such as in examples 3–4, over the top of the exposed and partially embedded microspheres.

The urethane topcoating is applied by standard coating methods such as curtain coating, slot die coating, reverse roll coating, knife over roll coating, air knife coating, gravure coating, reverse gravure coating, offset gravure coating, Meyer rod coating, etc. It is also possible to cast the urethane as a separate, single layer film using these coating techniques. To achieve proper performance and coat weight thickness in each of the coating operations, technical expertise must be applied to determine the optimal urethane solution viscosity. The application of these coating techniques is well known in the industry and can effectively be implemented by one skilled in the art. The preferred method is determined by the knowledge and expertise of the manufacturing facility applying the coating. Further information on coating methods can be found in "Modern Coating and Drying Technology", by Edward Cohen and Edgar Gutoff, VCH Publishers, Inc., 1992. Extrusion can be considered as an alternate method of forming a urethane film or topcoat. The coated urethane mixture and the base coat layer are then subjected to an elevated temperature to cure the urethane mixture and to complete the drying of the space coat layer.

The polymer coated casting sheet then is stripped from the space coat layer, and a reflective layer is subsequently applied over the back surface of the space coat. For example, a reflective layer of silver or aluminum metal can be applied by vapor deposition over the back surface of the space coat. The thickness of the reflective layer depends on the particular metal used and is generally between about 20 and 125 nanometers. The topcoat layer then can be printed with UV radiation curable inks to provide monocolor or multicolor images with the optional transparent overcoat as described above.

An alternate manufacturing process for enclosed bead-type retroreflective products can be used by first casting an aliphatic polyurethane mixture as described above in Examples 3–6 onto a casting sheet and exposing the newly cast film to heat for solvent evaporation and urethane curing. After the film is formed, a bead bonding layer is applied and typically exposed to elevated temperatures for curing and/or evaporation of a carrier vehicle, such as solvent. Though many materials may be used for the bead bond layer, a thermoplastic polymer is preferred. The bead bond layer can then be partially cured or re-softened by the application of heat to allow cascade coated microspheres to form a monolayer of microspheres. The microspheres generally are embedded into the layer to a depth of about one-half of the average diameter of the microspheres in a process that uses the application of heat and/or pressure. The space coat layer of desired thickness is then applied over the exposed microspheres. Next, the space coat and base coat layer are subjected to elevated temperatures to complete solvent drying and curing.

A reflective layer is subsequently applied over the back surface of the space coat layer. For example, a reflective layer of silver or aluminum metal can be applied by vapor deposition over the back surface of the space coat at a thickness of generally between about 20 and 125 nanometers. The required thickness of the reflective surface varies based on the type of metal used. After the original casting sheet is stripped from the product, the top aliphatic polyurethane layer can be printed with UV radiation curable inks to provide monocolor or multicolor images with the optional transparent overcoat or overlaminate film, as previously described.

In another embodiment illustrated in FIG. 2, the retroreflective sheeting described in a previous paragraph is provided with a pressure-sensitive adhesive construction. In this embodiment, a pressure-sensitive adhesive is coated onto a release coated liner (paper or polymer) thereafter the adhesive coated liner is pressure laminated to the exposed surface of the reflective layer. This embodiment is illustrated in FIG. 2. The release coated liner can subsequently be removed and the retroreflective sheeting can be adhesively applied to other surfaces.

The following examples illustrate the preparation of enclosed lens retroreflective sheeting in accordance with the present invention.

EXAMPLE A

A sheeting as illustrated in FIG. 1 is manufactured by first casting a space coat layer at a coat weight of approximately 21 g/m² on a polymer coated casting sheet and curing for about 5 minutes at a temperature of about 235° F. (112° C.). The space coat layer is a 22% solid solution comprised of polyvinyl butyral resin dispersed in a solvent. While the space coat layer remains in an uncured, tacky state, glass microspheres are cascade-coated onto the tacky film to form a monolayer of microspheres, and the microspheres are embedded to about 50% of their diameter by applying pressure. The glass microspheres have a mean diameter of about 50 microns with a refractive index of about 2.10 to 2.14. The urethane solution of Example 3, having been prepared prior to the coating run, is coated over the top of the exposed and partially embedded glass microspheres and cured for approximately 5 minutes at temperatures ranging from about 160° F. to 250° F.

In a separate operation, the polymer coated casting sheet is stripped from the sheeting, and the final layer, a reflective layer of aluminum metal, is subsequently applied by vapor deposition over the back surface of the space coat. The deposited layer of aluminum metal is very thin and estimated to be approximately 100 nm. For production monitoring purposes, it is more efficient to measure the quantity of metal deposited by electrical measurement. A resistance reading in the range of about 0.7 to 1.2 ohms/in² is considered acceptable. After the aluminum metal has been applied, an image is printed on the exposed surface of the urethane layer using a UV radiation curable ink or inks as described above. After the ink has been cured, a clear UV curable overcoat is deposited over the images and exposed urethane layer and cured. The sheeting obtained in this Example is identical to the sheeting illustrated in FIG. 1

EXAMPLE B

To form a pressure sensitive adhesive construction, a pressure sensitive adhesive is coated onto a silicone coated release liner and pressure laminated to the reflective aluminum layer of the sheeting described in Example A. Typically, the pressure sensitive adhesive is a solvent acrylic adhesive of about 1 mil in thickness. Though other release coatings are available, silicone based polymers are the preferred release coating by the pressure sensitive adhesive industry. A cross-section of the resultant product is shown in FIG. 2.

The image bearing retroreflective sheeting of the present invention also includes image-bearing encapsulated-lens retroreflective sheeting such as illustrated in FIG. 3. Encapsulated-lens retroreflective sheeting generally comprises (1) a base sheet that comprises a monomer of retroreflective elements partially embedded in a binder layer; (2) a cover sheet disposed in spaced relationship from the layer of retroreflective elements; and a network of intersecting bonds that extend between the cover sheet and the base sheet and comprise a binder material thermoformed at the point of contact between said bonds and said cover sheet to form a plurality of cells within which retroreflective elements are hermetically sealed and to adhere the base sheet to the cover sheet. The cover sheet comprises an image-bearing aliphatic polyurethane film as described previously, and the image may be a monocolor image or a multicolor image. Generally, a clear overcoat film layer is placed over the image as a protective layer for the image and the retroreflective sheeting.

More particularly, the present invention includes image-bearing encapsulated-lens retroreflective sheeting which comprises (1) a base sheet that comprises a monolayer of retroreflective elements partially embedded in a binder layer; (2) a cover sheet disposed in spaced relationship from the layer of retroreflective elements; and (3) a network of intersecting bonds that extend between said cover sheet and said base sheet and comprise binder material thermo-formed at the point of contact between said bonds and said cover sheet to form a plurality of cells within which retroreflective elements are hermetically sealed and to adhere the base sheet to the cover sheet, wherein the cover sheet comprises an image bearing aliphatic polyurethane film comprising an aliphatic polyurethane film derived from a film-forming mixture comprising (A) an aliphatic polyurethane, and
(B) at least one hydroxy-containing imidazoline represented by the formula

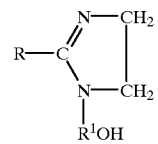

wherein R is an aliphatic group containing from about 10 to about 22 carbon atoms and R¹ is an alkylene group containing from 1 to about 3 carbon atoms, said film having printed thereon either a monocolor image and a clear overcoat or a multicolor image with or without a clear overcoat wherein the monocolor image is derived from at least one UV radiation curable ink which is cured prior to application of the clear overcoat, and the multicolor image is derived from at least two UV radiation curable inks applied sequentially with curing after each ink application and before application of any clear overcoat.

An embodiment of the image-bearing encapsulated-lens retroreflective sheeting of the present invention is illustrated in FIG. 3 wherein the sheeting comprises: a base sheet or cushion coat 32 on a support layer 38 having a layer of retroreflective glass microspheres 31 having a partial metalized layer 33 partially embedded in the exposed surface of the cushion coat 32; a cover sheet 35 disposed in space relation in front of the layer of the retroreflective glass microspheres and thermally laminated to the cushion coat 32 only in the extruded bridge areas 34 which form a network of intersecting bonds between the cushion coat 32 and the cover sheet 35 at the points of contact; an adhesive 39 and silicone coated release liner 40 having its adhesive surface in contact with the exposed surface of the support layer 38; a discontinuous image 36 in contact with the upper surface 35A of the cover sheet 35; and a clear polymeric overcoat 37 positioned above and in contact with the upper surface of 35A of cover sheet 35 and the upper surface of the image 36.

The glass microspheres generally utilized in the preparation of the encapsulated lens retroreflective sheeting such as illustrated in FIG. 3 may be any of the glass microspheres described earlier with regard to the enclosed lens sheeting having a refractive index of from 1.9 to 2, preferably 1.91 to 1.95. The base sheet or cushion coat generally comprises a layer of thermoplastic polymer such as a polyurethane, a polyester, etc., and the support layer or film 38 may be any one of a number of polymeric materials such as vinyl polymers (e.g., PVC), polymethylmethacrylate, polyvinyl alcohol, etc.

The cover sheet 35 generally is a single layer and may comprise various thermoplastic polymers including acrylic polymer such as polymethylmethacrylate; vinyl polymers such as PVC and vinyl acrylic copolymers, or polyurethanes such as aliphatic polyether urethanes. In the present invention, the cover sheet 35 comprises an image bearing aliphatic polyurethane as described above. The aliphatic polyurethane cover sheet is prepared prior to conversion into an encapsulated bead retroreflective product by casting the urethane onto a polymer coated paper casting sheet or onto a polymer casting sheet. Casting sheet products are well known to the industry and supplied by companies such as Felix Schoeller Technical Papers, Pulaski, N.Y., S.D. Warren of Newton Center, Mass. and Ivex Corporation of Troy, Ohio. The urethane coating is cast onto the casting sheet by standard coating methods such as curtain coating, slot die coating, reverse roll coating, knife over roll coating, air knife coating, gravure coating, reverse gravure coating, offset gravure coating, Meyer rod coating, etc. To achieve proper performance and coat weight thickness in each of the coating operations, technical expertise is applied to determine the optimal urethane solution viscosity. The application of these coating techniques is well known in the industry and can effectively be implemented by one skilled in the art. The preferred method is determined by the knowledge and expertise of the manufacturing facility applying the coating. Further information on coating methods can be found in "Modern Coating and Drying Technology", by Edward Cohen and Edgar Gutoff, VCH Publishers, Inc., 1992. Extrusion is an alternate method of forming a urethane film. The compositions of the adhesive layer 39 and the liner 40 are as described above with respect to the enclosed sheeting illustrated in FIG. 2.

Procedures for preparing encapsulated lens retroreflective sheeting such as illustrated in FIG. 3 are known in the art. U.S. patents describing encapsulated lens retroreflective sheeting include U.S. Pat. Nos 3,190,178 and 4,025,159, and the disclosure of these patents with regard to the process for preparing the encapsulated lens retroreflective sheeting is hereby incorporated by reference.

In one embodiment, the image bearing encapsulated-lens retroreflective sheeting of the present invention may be prepared by a general procedure which may be described as follows.

(1) Glass microspheres are embedded into a substrate which comprises a polyolefin such as a low-density polyethylene layer which is coated onto a polyester film. The substrate is heated to soften the polyolefin as the glass beads are brought into contact with and partially embedded into the polyolefin.

(2) The beaded polyolefin/polyester substrate is placed in a vacuum metalizer, and the surface containing the partially exposed glass beads is vacuum metalized with aluminum whereby a coating of aluminum is deposited on the exposed surface of the glass beads and the exposed surface of the polyolefin.

(3) A base sheet or cushion coat is prepared by coating a film comprising a thermoplastic polymer (e.g., a polyurethane) onto a release liner, and thereafter transferring the coated film by heat onto a support layer such as a 1 or 2-mill thick vinyl or polymethylmethacrylate layer which has been deposited on a casting substrate such as paper.

(4) The base sheet or cushion coat is then thermally bonded to the exposed aluminum coated surface of the glass beads by bringing the cushion coat into contact with the glass beads at an elevated temperature with mild pressure.

(5) After cooling, the glass beads are removed from the polyolefin/polyester substrate by stripping the substrate from the cushion coat and support layer. The glass beads prefentially adhere to the cushion coat. The casting substrate (paper) is then removed.

(6) The bead-containing cushion coat with support layer is placed in contact with a preformed cover sheet, and the cover sheet is thermally laminated to the cushion coat by embossing the laminate from the cushion coat side with an embossing die having a predetermined pattern so that the embossing procedure results in the formation of a network of narrow intersecting bonds that extend between the cover sheet and the cushion coat or base sheet at the point of contact between the bonds and the cover sheet as the embossing pattern forces the cushion coat through the spaces between the beads and into contact with the cover sheet in selected areas. Thus, the cover sheet is thermally laminated to the cushion coat only in the bridge areas where the raised surface of an embossing dye has been pressed against the cushion coat and support layer. The glass beads in the bridge areas are surrounded by binder (cushion coat). At least a monomolecular air gap is formed between the beads and the cover sheet in the hermetically sealed areas formed by the network of intersecting bonds.

(7) An adhesive coated liner optionally can then be brought into contact with and laminated to the support layer which is beneath the cushion coat layer.

(8) An image is deposited on the exposed surface of the cover sheet utilizing a UV radiation curable printing ink, and after curing of the ink, a transparent overcoat layer is then deposited above and in contact with the image and the cover sheet, generally as a protective layer.

In one alternative embodiment, the retroreflective sheetings of the present invention may contain a second image which is beneath the cover sheet and either printed on the inside surface of the cover sheet or on the glass beads.

The image bearing retroreflective sheeting of the present invention is generally useful for imparting retroreflectivity in various applications such as license plates, traffic signs, pavement markings, construction zone markings, etc. More particularly, the retroreflective sheeting of the present invention having a printed display on the surface can be utilized in applications such as highway signs, including contoured signs, commercial signs, fleet markings and fleet graphics, building graphics, temporary and permanent traffic control devices signs, and printed decals. Other printed surface applications of the retroreflective sheetings of the present invention include vehicle markings, computer cut graphics, die cut graphics, pin-stripping for vehicles, boats etc., decorating applications on various articles such as notebooks, book bags, backpacks, boats, cars, etc., pet collars, toy labels, fire hydrant markings, mud flaps, fish lures, baby strollers, helmet markings, etc.

The printing characteristics of the aliphatic urethane top layer can be improved by increasing the surface energy of the urethane topcoat which is characteristically in the range of from about 36 to about 44 dynes/cm. One method which has been found to be successful in increasing the surface energy to values generally in excess of 50 dynes/cm comprises laminating a thin film of polyester (about 1 mil) to the urethane topcoat after the urethane topcoat has been applied and cured and before the polymer coated casting sheet is removed from the construction and the reflective layer of aluminum is applied. The polyester film and/or lamination procedure results in the smoother surface for the urethane topcoat and, when the polyester film is removed, an increase in the surface energy to about 48 to about 54 dynes/cm. The surface energy of the urethane film also can be increased to greater than about 70 dynes/cm. by corona treatment of the urethane surface. Utilizing these procedures, the print aesthetics and print anchorage are improved. This procedure for preparing enclosed lens retroreflective sheeting having improved surface energy and printability characteristics is illustrated in the following example.

EXAMPLE C

A retroreflective sheeting is prepared by first casting a space coat layer at a coat weight of approximately 21 g/m$^2$ on a polymer coated casting sheet and curing for about 5 minutes at a temperature of about 235° F. (112° C.). The space coat layer is a 22% solid solution comprised of polyvinyl butyral resin dispersed in a solvent. While the space coat layer remains in an uncured, tacky state, glass microspheres are cascade-coated onto the tacky film to form a monolayer of microspheres, and the microspheres are embedded to about 50% of their diameter by applying pressure. The glass microspheres have a mean diameter of about 50 microns with a refractive index of about 2.10 to 2.14. The urethane solution of Example 3, having been prepared prior to the coating run, is coated over the top of the exposed and partially embedded glass microspheres and cured for approximately 5 minutes at temperatures ranging from about 160° F. to 250° F.

After the urethane coating has been cured, a 1 mil polyester film is laminated to the exposed surface of the urethane topcoat by passing the composite sheeting prepared above and the 1 mil polyester film through a nip point which applies a light pressure (generally less than 3 psig). Subsequently, the polymer coated casting sheet is stripped from the sheeting, and the final layer, a reflective layer of aluminum metal is applied by vapor deposition over the back surface of the space coat. The deposited layer of aluminum metal is very thin (about 10 nm). The polyester film previously laminated to the urethane surface is then removed leaving a smooth urethane surface having an acceptable surface energy.

In other embodiments, a protective clear film may be applied (generally with an adhesive) over the image bearing clear urethane cover sheet of the reflective sheetings of the invention. The composition of the protective layer, also referred to herein as the "overlaminate film", is selected to provide additional protection or properties not readily obtainable with the UV radiation curable clear overcoats such as cleanability. For example graffiti which is placed on such overlaminate films can be easily removed by washing. Examples of useful overlaminate films include PVC and various fluoropolymer films such as Tedlar, ETFE, polyvinylidene difluoride (PVDF), etc. Tedlar is available from DuPont and comprises polyvinyl fluoride. ETFE, also available from DuPont, is a copolymer of ethylene and tetrafluoroethylene. ETFE is described in more detail in the Encyclopedia of Polymer Science and Technology, Supplement No. 1, 1976 at pages 268–277.

The protective films generally are applied to the sheeting with an adhesive, more specifically a pressure sensitive adhesive. The adhesive layer is first applied to a release sheet, and a film (e.g., cast film) of polymer such as Tedlar, PVC or ETFE is cast over the exposed side of the adhesive layer. When it is desired to apply the protective film and adhesive layer to the reflective sheeting, the release sheet is removed (the adhesive layer is transferred to the protective film), and the adhesive layer is brought into contact and adhered to the outer layer of the reflective sheeting which is the image bearing surface.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A polyurethane film-forming mixture comprising (A) an aliphatic polyurethane derived from an aliphatic polyisocyanate and a polyester polyol prepared from a mixture comprising at least one polyol component and at least one dicarboxylic acid or anhydride component selected from the group consisting of phthalic acid or anhydride, adipic acid, azelaic acid, suberic acid and cyclohexane dicarboxylic acid provided that when the dicarboxylic acid or anhydride component comprises a mixture of acids and/or anhydrides, isophthalic acid or anhydride is not the major dicarboxylic acid or anhydride present in the mixture, and (B) at least one hydroxy-containing imidazoline represented by the formula

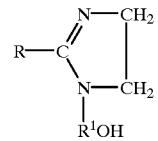

wherein R is an aliphatic group containing from about 10 to about 22 carbon atoms and R$^1$ is an alkylene group containing from 1 to about 3 carbon atoms.

2. The mixture of claim 1 wherein the polyol component is selected from glycerol, 1,6-hexanediol, glycerine and trimethylol propane.

3. The mixture of claim 1 wherein the dicarboxylic acid component comprise phthalic acid or anhydride.

4. An image bearing aliphatic polyurethane film comprising an aliphatic polyurethane film derived from a film-forming mixture comprising (A) an aliphatic polyurethane, and (B) at least one hydroxy-containing imidazoline represented by the formula

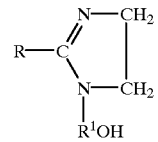

wherein R is an aliphatic group containing from about 10 to about 22 carbon atoms and R$^1$ is an alkylene group containing from 1 to about 3 carbon atoms, said film having printed thereon either a monocolor image and a clear overcoat or a multicolor image with or without a clear overcoat wherein the monocolor image is derived from at least one UV radiation curable ink which is cured prior to application of the clear overcoat, and the multicolor image is derived from at least two UV radiation curable inks applied sequentially with curing after each ink application and before application of any clear overcoat.

5. The film of claim 4 wherein the aliphatic polyurethane is derived from an aliphatic polyisocyanate and a polyester polyol, polycaprolactone polyol, or polyether polyol.

6. The film of claim 4 wherein the aliphatic polyurethane is derived from an aliphatic polyisocyanate and a polyester polyol.

7. The film of claim 4 wherein the aliphatic polyurethane is derived from an aliphatic polyisocyanate and one or more polyester polyols prepared from mixtures comprising at least one dicarboxylic acid selected from phthalic acid or anhydride, adipic acid, azelaic acid, suberic acid, and cyclohexane dicarboxylic acid, and at least one polyol selected from glycerol, 1,6-hexanediol, glycerine, and trimethylol propane.

8. The film of claim 7 wherein a dicarboxylic acid in at least one mixture is phthalic acid or anhydride.

9. The film of claim 4 wherein the aliphatic polyurethane is derived from an aliphatic polyisocyanate and a polyester polyol prepared from a mixture comprising (A-1) a dicarboxylic acid component comprising isophthalic acid as the major dicarboxylic acid; and (A-2) a polyol component.

10. The film of claim 9 wherein the dicarboxylic acid component (A-1) contains (i) from about 40 to about 80 mole percent of isophthalic acid, (ii) from about 20 to about 50 mole percent of at least one dicarboxylic acid of the formula $$HOOC(CH_2)_nCOOH$$

wherein n is an integer of from 2 to about 8, and (iii) from 0 to about 20 mole percent of at least one other dicarboxylic acid or dicarboxylic acid anhydride selected from terephthalic acid, phthalic acid, phthalic acid anhydride, tetrahydrophthalic acid, tetrahydrophthalic acid anhydride, hexahydrophthalic acid and hexahydrophthalic acid anhydride.

11. The film of claim 10 wherein the dicarboxylic acid (ii) is adipic acid and (iii) is phthalic acid and/or phthalic acid anhydride.

12. The film of claim 9 wherein the polyol component (A-2) contains (iv) from about 70 to about 90 mole percent of 1,6-hexanediol and (v) from about 10 to about 30 mole percent of at least one higher hydric polyol.

13. The film of claim 12 wherein the higher hydric polyol is selected from the group consisting of trimethylol propane, glycerol, pentaerythritol, and mixtures thereof.

14. The film of claim 4 wherein the film-forming mixture also comprises (C) cellulose acetate butyrate.

15. The film of claim 14 wherein the cellulose acetate butyrate contains from about 30% to about 60% of butyryl groups.

16. The film of claim 4 wherein the film-forming mixture also comprises (D) at least one non-reactive solvent.

17. The film of claim 4 wherein the clear overcoat film is derived from a clear UV curable film-forming mixture.

18. A multicolor image bearing aliphatic polyurethane film comprising an aliphatic polyurethane film derived from a film-forming mixture comprising (A) an aliphatic polyurethane, (B) at least one hydroxy-containing imidazoline represented by the formula $$R-C \underset{N-CH_2}{\overset{N=CH_2}{\diagup}} \\ \underset{R^1OH}{|}$$

wherein R is an aliphatic group containing from about 10 to about 22 carbon atoms and $R^1$ is an alkylene group containing from 1 to about 3 carbon atoms, and said film having printed thereon a multicolor image derived from at least two UV radiation curable inks applied sequentially with curing after each ink application.

19. The film of claim 18 wherein the aliphatic polyurethane is derived from an aliphatic polyisocyanate and a polyester polyol, polycaprolactone polyol or polyether polyol.

20. The film of claim 18 wherein the aliphatic polyurethane is derived from an aliphatic polyisocyanate and a polyester polyol.

21. The film of claim 18 wherein the aliphatic polyurethane is derived from an aliphatic polyisocyanate and one or more polyester polyols prepared from mixtures comprising at least one dicarboxylic acid selected from phthalic acid or anhydride, adipic acid, azelaic acid, suberic acid, and cyclohexane dicarboxylic acid, and at least one polyol selected from glycerol, 1,6-hexanediol, glycerine, and trimethylol propane.

22. The film of claim 21 wherein a dicarboxylic acid in at least one mixture is phthalic acid.

23. The film of claim 18 wherein the aliphatic polyurethane is derived from an aliphatic polyisocyanate and a polyester polyol prepared from a mixture comprising (A-1) a dicarboxylic acid component comprising isophthalic acid as the major dicarboxylic acid; and (A-2) a polyol component.

24. The film of claim 23 wherein the dicarboxylic acid component (A-1) contains (i) from about 40 to about 80 mole percent of isophthalic acid, (ii) from about 20 to about 50 mole percent of at least one dicarboxylic acid of the formula $$HOOC(CH_2)_nCOOH$$

wherein n is an integer of from 2 to about 8, and (iii) from 0 to about 20 mole percent of at least one other dicarboxylic acid or dicarboxylic acid anhydride selected from terephthalic acid, phthalic acid, phthalic acid anhydride, tetrahydrophthalic acid, tetrahydrophthalic acid anhydride, hexahydrophthalic acid and hexahydrophthalic acid anhydride.

25. The film of claim 24 wherein the dicarboxylic acid (ii) is adipic acid and (iii) is phthalic acid and/or phthalic acid anhydride.

26. The film of claim 23 wherein the polyol component (A-2) contains (iv) from about 70 to about 90 mole percent of 1,6-hexanediol and (v) from about 10 to about 30 mole percent of at least one higher hydric polyol.

27. The film of claim 26 wherein the higher hydric polyol is selected from the group consisting of trimethylol propane, glycerol, pentaerythritol, and mixtures thereof.

28. The film of claim 18 wherein the film-forming mixture also comprises (C) cellulose acetate butyrate.

29. The film of claim 28 wherein the cellulose acetate butyrate contains from about 30% to about 60% of butyryl groups.

30. The film of claim 18 wherein the film-forming mixture also comprises (D) at least one non-reactive solvent.

31. The film of claim 18 wherein a clear overcoat film is applied over the multicolor image.

32. The film of claim 31 wherein the clear overcoat film is derived from a UV radiation curable clear film-forming mixture.

33. Retroreflective sheeting having a multicolor image bearing aliphatic polyurethane cover sheet obtainable from a film-forming mixture comprising (A) an aliphatic polyurethane, (B) at least one hydroxy-containing imidazoline represented by the formula

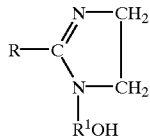

wherein R is an aliphatic group containing from about 10 to about 22 carbon atoms and $R^1$ is an alkylene group containing from 1 to about 3 carbon atoms, and (C) cellulose acetate butyrate said cover sheet having printed thereon a multicolor image derived from at least two UV radiation curable inks applied sequentially with curing after each ink application.

34. The sheeting of claim 33 wherein the aliphatic polyurethane is derived from an aliphatic polyisocyanate and a polyester polyol, polycaprolactone polyol, or polyether polyol.

35. The sheeting of claim 33 wherein the aliphatic polyurethane is derived from an aliphatic polyisocyanate and one or more polyester polyols prepared from mixtures comprising at least one dicarboxylic acid selected from phthalic acid or anhydride, adipic acid, azelaic acid, suberic acid, and cyclohexane dicarboxylic acid, and at least one polyol selected from glycerol, 1,6-hexanediol, glycerine, and trimethylol propane.

36. The sheeting of claim 33 wherein a dicarboxylic acid in at least one mixture is phthalic acid.

37. The sheeting of claim 33 wherein the aliphatic polyurethane is derived from an aliphatic polyisocyanate and a polyester polyol prepared from a mixture comprising (A-1) a dicarboxylic acid component comprising isophthalic acid as the major dicarboxylic acid; and (A-2) a polyol component.

38. The sheeting of claim 37 wherein the dicarboxylic acid component (A-1) contains (i) from about 40 to about 80 mole percent of isophthalic acid, (ii) from about 20 to about 50 mole percent of at least one dicarboxylic acid of the formula

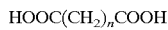

wherein n is an integer of from 2 to about 8, and (iii) from 0 to about 20 mole percent of at least one other dicarboxylic acid or dicarboxylic acid anhydride selected from terephthalic acid, phthalic acid, phthalic acid anhydride, tetrahydrophthalic acid, tetrahydrophthalic acid anhydride, hexahydrophthalic acid and hexahydrophthalic acid anhydride.

39. The sheeting of claim 38 wherein the dicarboxylic acid (ii) is adipic acid and (iii) is phthalic acid and/or phthalic acid anhydride.

40. The sheeting of claim 37 wherein the polyol component (A-2) contains (iv) from about 70 to about 90 mole percent of 1,6-hexanediol and (v) from about 10 to about 30 mole percent of at least one higher hydric polyol.

41. The sheeting of claim 40 wherein the higher hydric polyol is selected from the group consisting of trimethylol propane, glycerol, pentaerythritol, and mixtures thereof.

42. The sheeting of claim 33 wherein the cellulose acetate butyrate contains from about 30% to about 60% of butyryl groups.

43. The sheeting of claim 33 wherein the film-forming mixture also comprises (D) at least one non-reactive solvent.

44. A multicolor image bearing embedded lens retroreflective sheeting comprising (A) a monolayer of transparent microsphere lenses;

(B) a polymeric spacing layer underlying and contacting the bottom surfaces of the lenses and having a back surface that is spaced from the bottom surfaces of the lenses;

(C) a reflective layer having its top surface in contact with the back surface of the spacing layer; and (D) an aliphatic polyurethane cover sheet overlying and conforming the top surface of the lenses and having a flat top surface, said cover sheet being derived from a film-forming mixture comprising (D-1) an aliphatic polyurethane, (D-2) at least one hydroxy-containing imidazoline represented by the formula

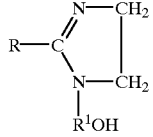

wherein R is an aliphatic group containing from about 10 to about 22 carbon atoms and $R^1$ is an alkylene group containing from 1 to about 3 carbon atoms, and (D-3) cellulose acetate butyrate, said cover sheet having printed thereon a multicolor image derived from at least two UV radiation curable inks applied sequentially with curing after each ink application.

45. The sheeting of claim 44 wherein the aliphatic polyurethane is derived from an aliphatic polyisocyanate and a polyester polyol, polycaprolactone polyol, or polyether polyol.

46. The sheeting of claim 44 wherein the aliphatic polyurethane is derived from an aliphatic polyisocyanate and one or more polyester polyols prepared from mixtures comprising at least one dicarboxylic acid selected from phthalic acid or anhydride, adipic acid, azelaic acid, suberic acid, and cyclohexane dicarboxylic acid, and at least one polyol selected from glycerol, 1,6-hexanediol, glycerine, and trimethylol propane.

47. The sheeting of claim 44 wherein a dicarboxylic acid in at least one mixture is phthalic acid.

48. The sheeting of claim 44 wherein the aliphatic polyurethane is derived from a film-forming mixture comprising (A-1) a dicarboxylic acid component comprising isophthalic acid as the major dicarboxylic acid; and (A-2) a polyol component.

49. The sheeting of claim 48 wherein the dicarboxylic acid component (A-1) contains (i) from about 40 to about 80 mole percent of isophthalic acid, (ii) from about 20 to about 50 mole percent of at least one dicarboxylic acid of the formula HOOC(CH$_2$)$_n$COOH wherein n is an integer of from 2 to about 8, and (iii) from 0 to about 20 mole percent of at least one other dicarboxylic acid or dicarboxylic acid anhydride selected from terephthalic acid, phthalic acid, phthalic acid anhydride, tetrahydrophthalic acid, tetrahydrophthalic acid anhydride, hexahydrophthalic acid and hexahydrophthalic acid anhydride.

50. The sheeting of claim 44 wherein the cellulose acetate butyrate contains from about 30% to about 60% by weight of butyryl groups.

51. The sheeting of claim 44 wherein the film-forming mixture of (D) also comprises (D-4) at least one non-reactive solvent other than (D-3).

52. The sheeting of claim 51 wherein the solvent (D4) is selected from the group consisting of butyl acetate, toluene, pm acetate and mixtures thereof.

53. The sheeting of claim 44 also comprising (E) a pressure-sensitive adhesive layer underlying the reflective layer (C), and, optionally, (F) a release layer underlying and in contact with the adhesive layer.

54. An image bearing encapsulated-lens retroreflective sheeting comprising (1) a base sheet that comprises a monolayer of retroreflective elements partially embedded in a binder layer; (2) a cover sheet disposed in spaced relationship from the layer of retroreflective elements; and (3) a network of intersecting bonds that extend between said cover sheet and said base sheet and comprise binder material thermo-formed at the point of contact between said bonds and said cover sheet to form a plurality of cells within which retroreflective elements are hermetically sealed and to adhere the base sheet to the cover sheet, wherein the cover sheet comprises an image bearing aliphatic polyurethane film comprising an aliphatic polyurethane film derived from a film-forming mixture comprising (A) an aliphatic polyurethane, and (B) at least one hydroxy-containing imidazoline represented by the formula

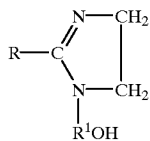

wherein R is an aliphatic group containing from about 10 to about 22 carbon atoms and R$^1$ is an alkylene group containing from 1 to about 3 carbon atoms, said film having printed thereon either a monocolor image and a clear overcoat or a multicolor image with or without a clear overcoat wherein the monocolor image is derived from at least one UV radiation curable ink which is cured prior to application of the clear overcoat, and the multicolor image is derived from at least two UV radiation curable inks applied sequentially with curing after each ink application and before application of any clear overcoat.

55. The sheeting of claim 54 wherein the aliphatic polyurethane is derived from an aliphatic polyisocyanate and a polyester polyol, polycaprolactone polyol, or polyether polyol.

56. The sheeting of claim 54 wherein the aliphatic polyurethane is derived from an aliphatic polyisocyanate and one or more polyester polyols prepared from mixtures comprising at least one dicarboxylic acid selected from phthalic acid or anhydride, adipic acid, azelaic acid, suberic acid, and cyclohexane dicarboxylic acid, and at least one polyol selected from glycerol, 1,6-hexanediol, glycerine, and trimethylol propane.

57. The sheeting of claim 56 wherein a dicarboxylic acid in at least one mixture is phthalic acid.

58. The sheeting of claim 54 wherein the aliphatic polyurethane is derived from a film-forming mixture comprising (A-1) a dicarboxylic acid component comprising isophthalic acid as the major dicarboxylic acid; and (A-2) a polyol component.

59. The sheeting of claim 58 wherein the dicarboxylic acid component (A-1) contains (i) from about 40 to about 80 mole percent of isophthalic acid, (ii) from about 20 to about 50 mole percent of at least one dicarboxylic acid of the formula HOOC(CH$_2$)$_n$COOH wherein n is an integer of from 2 to about 8, and (iii) from 0 to about 20 mole percent of at least one other dicarboxylic acid or dicarboxylic acid anhydride selected from terephthalic acid, phthalic acid, phthalic acid anhydride, tetrahydrophthalic acid, tetrahydrophthalic acid anhydride, hexahydrophthalic acid and hexahydrophthalic acid anhydride.

60. The sheeting of claim 54 wherein the cellulose acetate butyrate contains from about 30% to about 60% by weight of butyryl groups.

61. The sheeting of claim 54 wherein the film-forming mixture of (D) also comprises (D-4) at least one non-reactive solvent other than (D-3).

62. The sheeting of claim 61 wherein the solvent (D-4) is selected from the group consisting of butyl acetate, toluene, and mixture thereof.

63. The sheeting of claim 54 also comprising (E) a pressure-sensitive adhesive layer underlying the reflective layer (C), and, optionally, (F) a release layer underlying and in contact with the adhesive layer.

* * * * *